J. F. JOHNSTONE AND D. A. JOHNSTON.
CHILD'S VEHICLE.
APPLICATION FILED JUNE 15, 1921.
1,414,515.
Patented May 2, 1922.
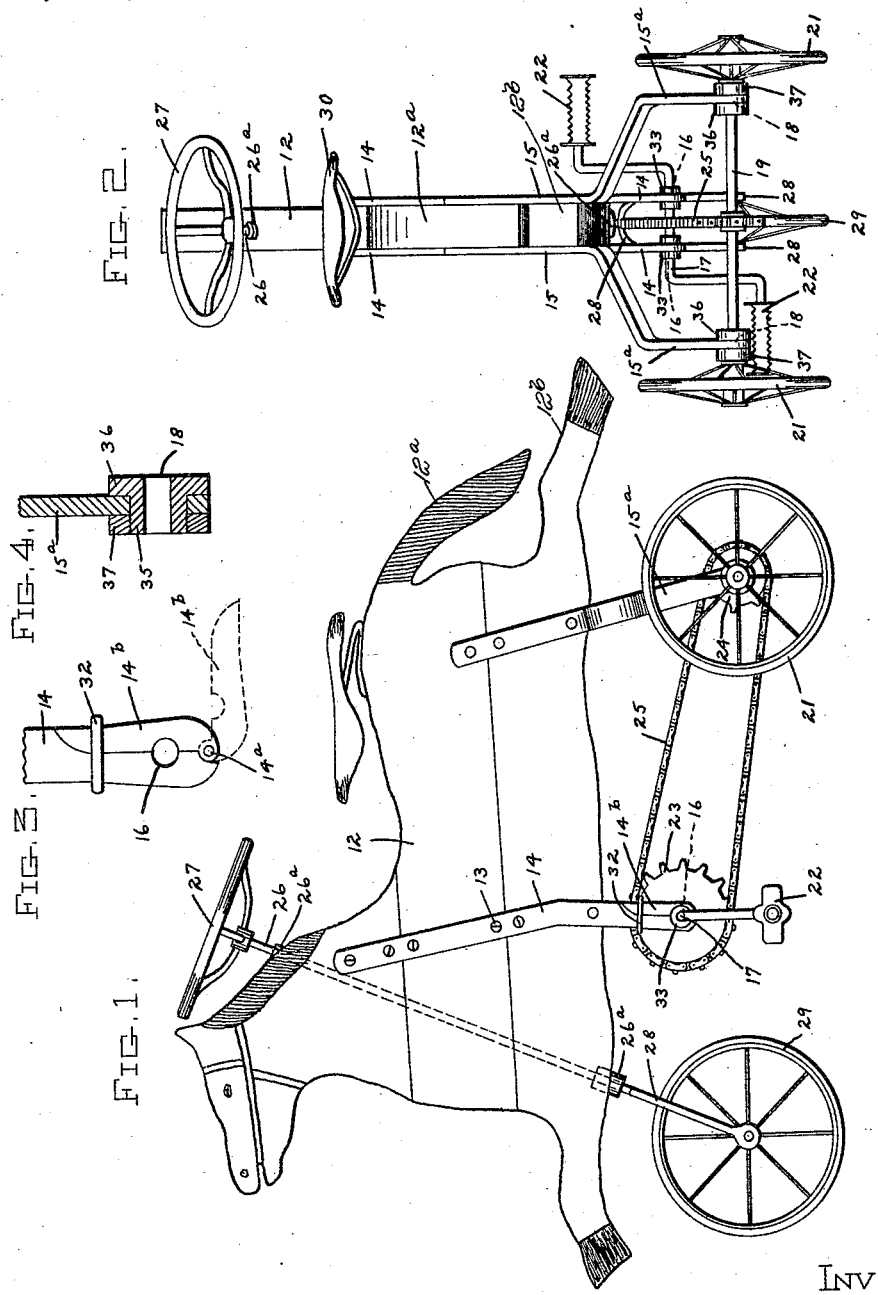

UNITED STATES PATENT OFFICE.

JACKSON F. JOHNSTONE, OF BOSTON, AND DAVID A. JOHNSTON, OF MELROSE, MASSACHUSETTS.

CHILD'S VEHICLE.

1,414,515.  Specification of Letters Patent.  Patented May 2, 1922.

Application filed June 15, 1921. Serial No. 477,674.

*To all whom it may concern:*

Be it known that we, JACKSON F. JOHNSTONE and DAVID A. JOHNSTON, citizens, respectively, of the Dominion of Canada and of the United States, residing at Boston and Melrose, in the counties of Suffolk and Middlesex, respectively, and State of Massachusetts, have invented new and useful Improvements in Children's Vehicles, of which the following is a specification.

This invention relates to a child's vehicle of the tricycle type, comprising a crank-shaft having pedals, a rear axle having driving wheels, torque-transmitting connections between the crank-shaft and the rear axle, a saddle, a steering-post having a steering-wheel, and a frame supporting the saddle, said frame having a bearing for the steering-post and bearings for the crank-shaft and the rear axle, the frame being supported by the steering and driving-wheels.

The invention is embodied in certain improvements hereinafter described and claimed, relating to the frame of a vehicle of this type.

Of the accompanying drawings forming a part of this specification,—

Figure 1 is a side elevation of a child's vehicle embodying the invention.

Figure 2 as a rear elevation of the same.

Figure 3 is a side view, showing one of the crank-shaft bearings.

Figure 4 is a sectional view, showing one of the rear axle bearings.

The same reference characters indicate the same parts in all of the figures.

In the drawings, 12 represents an elongated flat-sided body, preferably shaped so that when viewed from either side, its outline resembles that of a running horse. The body is preferably made of wooden planking, the flat sides of which constitute the sides of the body. Two or more sections may be employed, the sections being placed edge to edge, their meeting edges extending lengthwise of the body. The thickness of the planking and the thickness of the body from side to side, is preferably two inches or more. A body of large side area, closely resembling a horse when viewed from either side, may, therefore, be produced at a relatively small expense, and without the waste of material involved in carving a wooden body having the usual proportions of a horse.

Seated on the flat sides of the body, and attached thereto by screws, or rivets 13, are the upper portions of two pairs of reinforcing bars 14 and 15, which extend crosswise of the body, and project below the same. The forward bars 14 are provided at their projecting lower end portions with bearings 16, in which the crank-shaft 17 is journaled. The rear bars 15 are provided at their lower ends with bearings 18, in which the rear axle 19 is journaled. The lower end portions 15ª of the rear bars 15, containing the bearings 18, are offset from the body, as shown by Figure 2, so that the bearings 18 are widely separated, a sufficiently wide base being provided to prevent the body from tipping sidewise.

The rear axle 19 is provided with driving-wheels 21, fixed to the axle. The crank-shaft is provided with pedals 22. Torque may be transmitted from the crank-shaft to the rear axle by any suitable means, such as a sprocket wheel 23, fixed to the crank-shaft, a sprocket wheel 24, fixed to the rear axle, and a chain 25 engaged with said wheels.

26 represents a steering-post journaled in bearings 26ª in the forward portion of the body 12, and provided at its upper end with a hand-wheel 27, and at its lower end with a fork 28, in which the steering-wheel 29 is journaled. A saddle 30 is mounted on the rear portion of the body 12.

The upper portions of the bars which contact with the sides of the body, constitute shank portions which are elongated and extend from the lower edge across the major portions of the sides of the body and across the meeting edges of the body sections. As here shown, the upper ends of the shank portions of the bars 14 overlap the upwardly projecting portion simulating the neck of a horse. The shank portions are attached to the sections at opposite sides of the meeting edges thereof, so that they prevent the body from splitting at said meeting edges.

The crank-shaft and rear axle bearings may be of any suitable construction permitting the assemblage and separation of the parts.

Each crank-shaft bearing 16 may be divided as best shown by Figure 3, one-half of said bearing being formed in a section 14$^b$, hinged at 14$^a$ to a reduced end portion of the bar 14, and held in position to close the bearing by a slidable loop or sleeve 32. When said loop is moved upward, the section 14$^b$ may be displaced, as shown by dotted lines, to open the bearing. The crank-shaft is provided with fixed collars 33, abutting against opposite sides of the arms 14, to prevent endwise movement of the crank-shaft.

Each driving-shaft bearing 18 may be the bore of a sleeve 35 (Figure 4), having a head 36, abutting against one side of an offset bar portion 15$^a$. The sleeve is inserted in an orifice in the said bar portion, and is externally threaded and provided with a nut 37, abutting against the opposite side of the bar portion 15$^a$.

The body, as here shown, includes a portion 12$^a$ representing a tail, and a portion 12$^b$ representing a rear leg.

We claim:

In a child's vehicle of the character stated, a frame comprising a flat-sided body, composed of a plurality of sections, the meeting edges of which extend lengthwise of the body, a pair of forward reinforcing bars, and a pair of rear reinforcing bars, said bars including shank portions seated on the flat sides of the body, extending across the said meeting edges, and attached to the sections, at opposite sides of the meeting edges, and downwardly projecting end portions, provided with crank-shaft and rear-axle bearings.

In testimony whereof we have affixed our signatures.

JACKSON F. JOHNSTONE.
DAVID A. JOHNSTON.